(No Model.)

D. W. STEVENSON.
BICYCLE GUARD.

No. 599,406. Patented Feb. 22, 1898.

WITNESSES:
A. N. Bonney.
C. G. Graydon.

INVENTOR:
Daniel W. Stevenson
By his Att'y
Henry W. Williams.

UNITED STATES PATENT OFFICE.

DANIEL W. STEVENSON, OF BROCKTON, MASSACHUSETTS, ASSIGNOR OF ONE-HALF TO EDWIN L. SPRAGUE, OF BOSTON, MASSACHUSETTS.

BICYCLE-GUARD.

SPECIFICATION forming part of Letters Patent No. 599,406, dated February 22, 1898.

Application filed December 21, 1896. Serial No. 616,394. (No model.)

*To all whom it may concern:*

Be it known that I, DANIEL W. STEVENSON, a citizen of the United States, residing in Brockton, in the county of Plymouth and State of Massachusetts, have invented a new and useful Bicycle-Guard, of which the following is a specification.

This invention is a guard or fender applied to the frame of a bicycle and extending forward therefrom to a point in front of the front wheel and preferably at about the height of the axle thereof.

The guard or fender comprises a rod bent in substantially a V shape, with its apex or closed portion in front of the tire of the front wheel and with its ends on opposite sides thereof and supported by the frame. The effect in case of a collision is that the tire, rim, and spokes are protected in case the collision is "head on," while if the collision is, as is almost always the case, a trifle to one side the guard or fender causes the colliding bicycle or other object to glance off to one side without injuring either of the parties in collision. In fact, it is found in practice that in many cases of colliding bicycles where the collision would otherwise be serious enough to upset the riders and injure and entangle the machines by means of this guard the machines glance off without causing the riders to lose their seats.

The nature of the invention is fully described in detail below, and illustrated in the accompanying drawings, in which—

Figure 1:
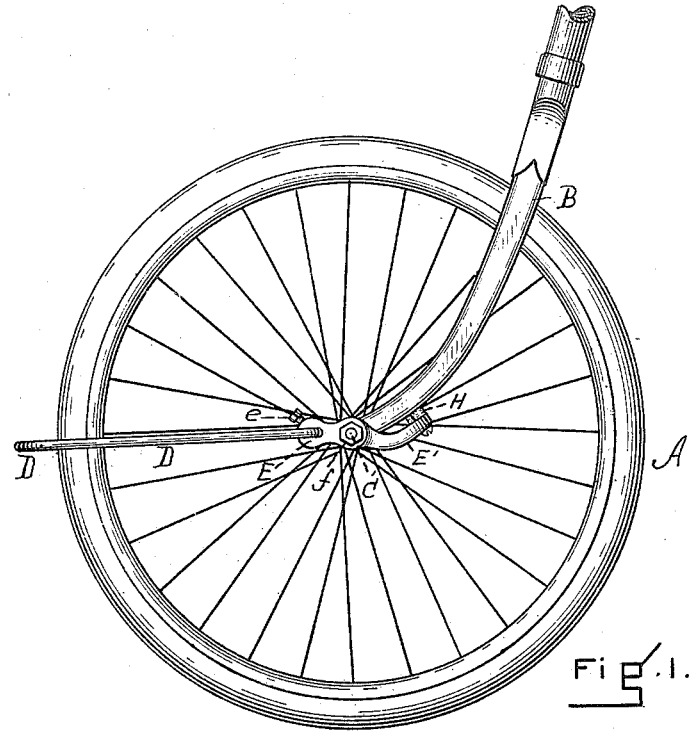
Figure 2:
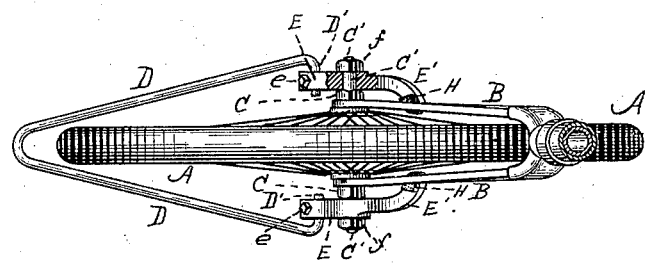

Figure 1 is a side view of the front wheel and a portion of the frame of a bicycle provided with my guard or fender. Fig. 2 is a plan view of the same, a small portion being shown in section in order to illustrate the method of applying the fender to the axle.

Similar letters of reference indicate corresponding parts.

A represents the front wheel, and B the fork. The nuts C on the axle of the front wheel are extended at C' outward, as shown in Fig. 2.

D represents a rod bent into the substantially V shape shown and with its rear ends D' bent or turned inward toward each other. These ends extend through the forward portions of the supporting-frames E, which are horizontally bored for the purpose, said V-shaped rod being held at any desired angle or height by means of the set-screws e. These frames E are horizontally bored to receive the extensions C', which support said frames, which are prevented from relative movement by the nuts f. The rear portions E' of these frames E extend inward and under the fork, against which they bear, as shown in Fig. 1, suitable cushions H being interposed between said fork and frames. Thus the extensions C' of the nuts C on the axle of the front wheel support the guard or fender, the fork prevents it from falling, and the set-screws e fix the angle of the guard, which is preferably a slight drop from a perfectly horizontal line.

As will readily be seen, in a head-on collision the extreme forward end of the guard D is struck, and the tire, rim, and spokes are protected, while if the blow of the collision is a little one side of the center the colliding bicycle will glance off on that side without imparting any injury and oftentimes without causing the rider of the bicycle provided with the guard to lose his seat.

The guard D is preferably metallic and is made as light as is possible without affecting its strength and rigidity and may be of any suitable shape in cross-section.

While the form shown is considered preferable, I do not propose to confine myself to it with exactness, but to employ, if deemed desirable, any form in which the guard extends from the frame to and around the front edge of the wheel.

Having thus fully described my invention, what I claim, and desire to secure by Letters Patent, is—

1. In combination with the frame of a bicycle, a guard consisting of a rod bent substantially into a V shape, with its closed end in front of the forward edge of the wheel and its rear ends secured to the frame, substantially as described.

2. The herein-described bicycle-guard, comprising the guard or fender proper D having its rear ends bent inward at D'; the nuts C on the axle of the forward wheel of the bicycle and provided with the outward horizontal extensions C'; and the frames E, E' supported by said extensions and with their rear ends bent inward under and against the frame of the bicycle, the forward ends of said frame being adapted to receive and hold adjustably said inwardly-bent ends D′, substantially as set forth.

3. In a bicycle-guard, the combination with the front wheel and frame of a bicycle, of a pair of supporting-frames resting upon parts extending from the wheel and underlying and bearing against the under sides of the bicycle-frame; and the guard-rod extending forward from said pair of frames around the front edge of the wheel, substantially as described.

DANIEL W. STEVENSON.

Witnesses:
HENRY W. WILLIAMS,
A. N. BONNEY.